United States Patent
Gersht et al.

(10) Patent No.: US 6,754,177 B1
(45) Date of Patent: Jun. 22, 2004

(54) METHOD AND SYSTEM FOR BURST CONGESTION CONTROL IN AN ATM NETWORK

(75) Inventors: Alexander Gersht, Boston, MA (US); Girish Pathak, Sudbury, MA (US); Alexander Shulman, Weston, MA (US)

(73) Assignees: Verizon Corporate Services Group Inc., New York, NY (US); Genuity Inc., Woburn, MA (US)

( * ) Notice: Subject to any disclaimer, the term of this patent is extended or adjusted under 35 U.S.C. 154(b) by 0 days.

(21) Appl. No.: 09/232,069

(22) Filed: Jan. 14, 1999

Related U.S. Application Data

(63) Continuation of application No. 09/105,905, filed on Apr. 26, 1998, now abandoned.

(51) Int. Cl.$^7$ .............................................. G01R 31/08
(52) U.S. Cl. ....................... 370/233; 370/230; 370/231
(58) Field of Search ................................ 370/230, 231, 370/233, 234, 235, 236.1, 236.2, 237

(56) References Cited

U.S. PATENT DOCUMENTS

| | | | |
|---|---|---|---|
| 5,253,247 A | | 10/1993 | Hirose et al. ................. 370/14 |
| 5,274,625 A | * | 12/1993 | Derby et al. .................. 370/17 |
| 5,315,586 A | * | 5/1994 | Charvillat .................... 370/60 |
| 5,359,593 A | | 10/1994 | Derby et al. .................. 370/17 |
| 5,530,698 A | | 6/1996 | Kozaki et al. ............. 370/60.1 |
| 5,602,830 A | | 2/1997 | Fichou et al. ............... 370/232 |
| 6,072,773 A | * | 6/2000 | Fichou et al. ............... 370/230 |
| 6,292,466 B1 | * | 9/2001 | Droz .......................... 370/232 |

OTHER PUBLICATIONS

ITU–T–Rec. 1.371, Traffic Control and Congestion Control in B–ISDN, Switzerland, Aug. 1996.
A. Gersht et al., Optimal Routing in Circuit–Switched Communication Networks, IEEE Transactions on Communications, vol. 37, No. 11, Nov. 1989.
A. Gersht et al., Virgual–Circuit Load Control in Fast Packet–Switch Broadband networks, Proc. of GLOBE-COM'88, Dec. 1988.
A. Gersht et al., Burst Level Congestion Control in ATM Networks, IEEE ISCC'98, Athens, Greece, Jun. 1998.

* cited by examiner

*Primary Examiner*—Alpus H. Hsu
*Assistant Examiner*—Thien D Tran
(74) *Attorney, Agent, or Firm*—Leonard C. Suchyta, Esq.; Joel Wall, Esq.; Pedro F. Suarez, Esq.

(57) ABSTRACT

A method and system for controlling congestion in an ATM network comprises the steps of pre-allocating, for a pre-determined interval of time, a set of burst access parameters to a set of pre-allocated virtual paths between a set of source node and destination node pairs in the ATM network, and controlling, at the burst level, the traffic at each source node based on the pre-allocated set of burst access parameters and without communicating with other nodes in the ATM network. Specifically, the network, for a pre-determined interval of time, pre-allocates a set of virtual paths between each source-destination node pair in the network, pre-allocates a set of maximum permitted rates to the pre-allocated set of virtual paths, respectively, and pre-assigns a set of burst access thresholds to a set of service classes, respectively, in the pre-allocated virtual paths, where the pre-assigned burst access thresholds are less than or equal to the corresponding pre-allocated maximum permitted rates. Based on the maximum permitted rates and the burst access thresholds, each source node in the network then controls, at the burst level, the traffic directed to the source node without communicating with other nodes in the network. A source node admits a detected burst onto a pre-allocated virtual path when a total reserved peak cell rate for all bursts that are in progress in the pre-allocated virtual path plus a peak cell rate of the detected burst is less than the identified burst access threshold. Otherwise, the source node rejects the detected burst from the network.

6 Claims, 5 Drawing Sheets

METHOD AND SYSTEM FOR BURST CONGESTION CONTROL IN AN ATM NETWORK

CROSS-REFERENCE TO RELATED APPLICATIONS

This application is a continuation-in-part of U.S. application Ser. No. 09/105,905, filed Jun. 26, 1998 now abandoned, the contents of which are hereby incorporated by reference.

BACKGROUND OF THE INVENTION

1. Field of the Invention

The present invention relates to Asynchronous Transfer Mode (ATM) networks, and more particularly, to methods and systems for congestion avoidance in ATM backbone networks.

2. Background of the Art

A communications network generally includes a plurality of nodes interconnected by transmission links (or "links"), which are defined by a specific bandwidth (or capacity). In an ATM network, a source node transmits data in the form of fixed sized cells to a destination node through a connection (referred to as a virtual circuit), which is established between the source node and the destination node. The virtual circuit may traverse zero or more nodes (i.e., switches) between the source node and the destination node. A group of virtual circuits between the source node and the destination node is referred to as a virtual path. The cells may include any type of digitized information, including audio, computer data, video, multimedia, Internet data, etc.

In an ATM backbone network, source nodes receive traffic from one or more external access networks. To control congestion in the network, the network uses a Connection Admission Control (CAC) method to determine the resources that are required to satisfy the quality of service (QoS) requirements of the virtual circuit associated with the traffic, and if the determined resources are available, to reserve the resources for that virtual circuit.

When a source node receives traffic from an external access network, the source node negotiates a traffic contract with the network, where the traffic contract includes the necessary information for determining the required resources to establish a virtual circuit in the network. Specifically, the traffic contract includes a traffic descriptor and QoS requirements. The traffic descriptor further includes a source traffic descriptor and a cell delay variation tolerance (CDVT). The parameters of the source traffic descriptor are typically peak cell rate (PCR), average or sustainable cell rate (SCR), and the maximum burst sizes (MBS).

Generally, the existing ATM networks use a variety of proprietary methods (known as the equivalent bandwidth methods) to determine the amount of bandwidth that the networks must reserve in order to satisfy the QoS requirements of the virtual circuits associated with the traffic. Once a network determines the required bandwidth, the network then determines if a virtual path in the network has sufficient bandwidth to accommodate the virtual circuit. If the network identifies such a virtual path, the network reserves the determined bandwidth on the links that support the virtual path. If the network cannot identify such a virtual path, the network rejects the traffic.

An ATM network typically reserves the required bandwidth for the entire duration of a virtual circuit associated with a traffic stream. Because the duration of a virtual circuit is substantially longer than the sum of the durations of the individual bursts in the traffic stream, the virtual circuit does not use the reserved bandwidth during the silent periods between bursts, and thus, resulting in an inefficient use of bandwidth for bursty traffic.

One known solution to the inefficient use of bandwidth for bursty traffic is to reserve the required bandwidth only for the duration of the individual bursts instead of the duration of the virtual circuit. Specifically, ITU-T Rec. I.371, "Traffic Control And Congestion Control In B-ISDN," Perth, U.K. Nov. 6–14, 1995, discloses a burst level reservation method known as the ABT method. In this method, the block of cells in each burst is enclosed by special management cells (referred to as RM cells), which identify the beginning and the end of each burst, respectively. An RM cell identifies the bandwidth that is required to transport the burst within the network.

There are two types of ABT methods namely, ABT with delay transmission (ABT/DT) and ABT with immediate transmission (ABT/IT). In a network that uses the ABT/DT method, when a source node receives a burst from an external access network, the source node sends an RM cell to the ATM network, requesting permission to admit the burst into the network. The source node then waits for an admission or a rejection notification from the network. The network determines whether it has the required bandwidth available to satisfy the QoS of the virtual circuit associated with the burst, and if so, the network reserves the required bandwidth for that virtual circuit and sends an admission notification to the source node. When the source node receives the admission notification, the source node admits the burst into the network. However, if the network determines that it does not have the required bandwidth available, the network sends a rejection notification to the source node.

In a network that uses the ABT/IT method, when a source node receives a burst from an external access network, the source node immediately admits the burst into the network without reserving the required bandwidth to transport the burst in the network. As a result, after admitting the burst into the network, if any link associated with the virtual circuit of the admitted burst does not have the required bandwidth available to transport the burst, the network discards the burst.

One disadvantage of the ABT/DT method is that in wide area networks, due to long propagation delays between nodes in the network, the process of determining and reserving the required bandwidth for each burst can be prohibitively long compared to the duration of the individual bursts and the burst inter-arrival times. The ABT/IT method, on the other hand, may exacerbate congestion in an already congested network by admitting bursts into the network, when the network does not have the required bandwidth to transport the bursts.

Thus, it is desirable to have a method and system for addressing the above and other disadvantages of the existing congestion control avoidance methods for bursty traffic in ATM networks.

SUMMARY OF THE INVENTION

Methods and systems consistent with the present invention control congestion in an ATM network by pre-allocating for a pre-determined interval of time a set of burst access parameters to a set of pre-allocated virtual paths between a set of source node and destination node pairs in the ATM network, and controlling, at the burst level, the traffic at each source node based on the pre-allocated set of burst access parameters and without communicating with other nodes in the ATM network. Specifically, the network pre-allocates, for a pre-determined interval of time, a set of virtual paths between each source-destination node pair in the network, pre-allocates a set of maximum permitted rates to the pre-allocated set of virtual paths, respectively, and pre-assigns a set of burst access thresholds to a set of service classes, respectively, in the pre-allocated virtual paths, where the pre-assigned burst access thresholds are less than or equal to the corresponding pre-allocated maximum permitted rates.

Each source node in the network then controls, at the burst level, the traffic directed to the source node based on the pre-allocated set of maximum permitted rates and the pre-assigned set of burst access thresholds and without communicating with other nodes in the network. Specifically, each source node detects the beginning of a burst in the traffic that is directed to that source node. From among the pre-allocated set of virtual paths between the source-destination node pair, the source node identifies a pre-allocated virtual path associated with the detected burst. The source node then identifies the service class of the detected burst, and the burst access threshold that corresponds to the identified service class. The source node admits the detected burst onto the identified pre-allocated virtual path when a total reserved peak cell rate for all bursts that are in progress in the identified pre-allocated virtual path plus a peak cell rate of the detected burst is less than the identified burst access threshold. Otherwise, the source node rejects the detected burst from the network.

Methods and systems consistent with the present invention provide a facility for engineering a set of burst access parameters, subject to network capacity, burst rejection quality of service requirements, and conservation flow constraints, such that a total weighted rate of burst rejections in a network is minimized. Specifically, the network computes a set of maximum permitted rates for each pre-allocated virtual path in the network. Based on the computed maximum permitted rates, the network computes estimated offered loads associated with each service class in each pre-allocated virtual path. Furthermore, based on the computed set of maximum permitted rates and the computed set of estimated offered loads, the network computes a set of burst access thresholds.

The summary and the following description of the invention should not restrict the scope of the claimed invention. Both provide examples and explanations to enable others to practice the invention. The accompanying drawings, which form part of the description of the invention, show several embodiments of the invention, and together with the description, explain the principles of the invention.

DETAILED DESCRIPTION

Figure 1:
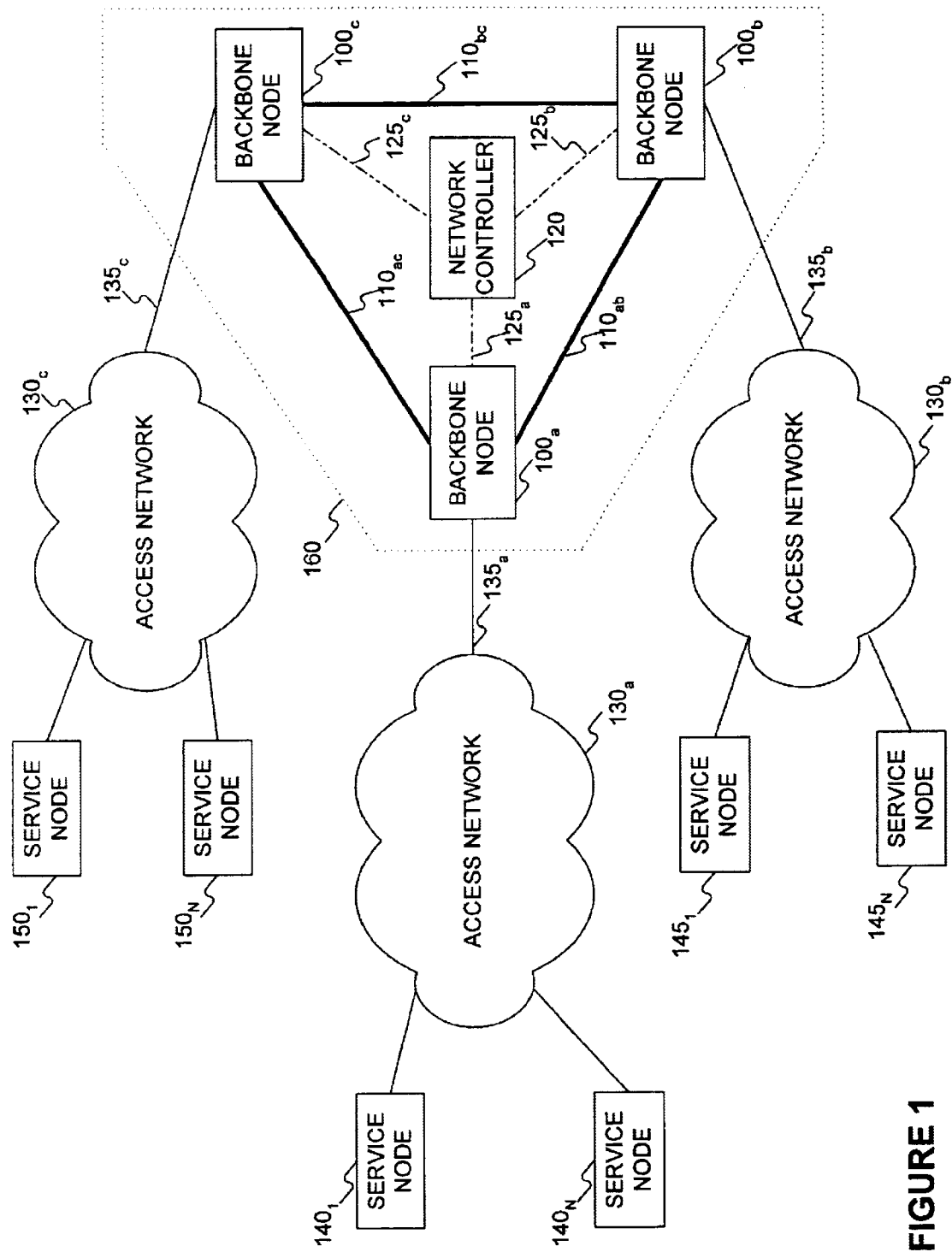
FIG. 1 is a block diagram of an ATM backbone network in accordance with an embodiment of the invention.

The following description of embodiments of this invention refers to the accompanying drawings. Where appropriate, the same reference numbers in different drawings refer to the same or similar elements.

Methods and systems consistent with the present invention pre-allocate, for a pre-determined interval of time, a set of burst access parameters to a set of pre-allocated virtual paths between a set of source node and destination node pairs in the ATM network, and control, at the burst level, the traffic at each source node based on the pre-allocated set of burst access parameters and without communicating with other nodes in the ATM network. Specifically, a network controller, for a pre-determined interval of time, pre-allocates a set of virtual paths between each source-destination node pair in the network, pre-allocates a set of maximum permitted rates to the pre-allocated set of virtual paths, respectively, and pre-assigns a set of burst access thresholds to a set of service classes, respectively, in the pre-allocated virtual paths, where the pre-assigned burst access thresholds are less than or equal to the corresponding pre-allocated maximum permitted rates. The network controller may adjust the pre-allocated virtual paths, the maximum permitted rates, and the burst access thresholds in, for example, hourly intervals to adapt to changes in traffic demand.

A burst controller in each source node then controls the traffic, at the burst level, based on the pre-allocated set of maximum permitted rates and the pre-assigned set of burst access thresholds and without communicating with other nodes in the network. Specifically, each burst controller detects the beginning of a burst in the traffic that is directed to a source node, identifies the pre-allocated virtual path associated with the detected burst, and identifies the service class of the detected burst and the burst access threshold that corresponds to the identified service class. If a total reserved peak cell rate for all bursts that are in progress in the identified pre-allocated virtual path plus a peak cell rate of the detected burst is less than the identified burst access threshold, the burst controller admits the detected burst onto the identified pre-allocated virtual path. Otherwise, the burst controller rejects the detected burst from the network.

Methods and systems consistent with the present invention engineer a set of burst access parameters, subject to network capacity, burst rejection quality of service requirements, and conservation flow constraints, such that a total weighted rate of burst rejections in a network is minimized. Specifically, the network computes a set of maximum permitted rates for each pre-allocated virtual path in the network. Based on the computed maximum permitted rates, the network computes estimated loads associated with each service class in each pre-allocated virtual path. Furthermore, based on the computed set of maximum permitted rates and the computed set of estimated loads, the network computes a set of burst access thresholds.

A source node is defined herein as a node in an ATM network that receives traffic from external networks, for example an access network, and routes the traffic through zero or more nodes via a pre-allocated virtual path to a destination node in the ATM network. A destination node herein is defined as a node in an ATM network that receives traffic from one or more source nodes as defined herein, and routes the traffic to external networks, for example access networks, or end users. A burst is generally and broadly defined herein as a stream of consecutive cells in a traffic stream, where each cell is separated by a time interval that is statistically significantly shorter than the silent periods in the traffic stream. A bursty traffic stream may generally include one or more streams of consecutive cells.

FIG. 1 is a block diagram of an ATM backbone network 160 in accordance with an embodiment of the invention. Network 160 comprises backbone nodes 100a–100c, network controller 120, transmission links (or "links") 110ab, 110ac, and 110ab, and links 125a–125c. Nodes 100a through 100c may include, for example, a backbone switch or backbone router.

Node 100a connects to nodes 100b and 100c via transmission links 110ab and 110ac, respectively. Node 100b connects to node 100c via transmission link 110bc. Nodes 100a–100c connect to network controller 120 via links 125a–125c, respectively. Network controller 120 communicates information via links 125a–125c to nodes 100a–100c, respectively.

Nodes 100a–100c also connect to external access networks 130a–130c via transmission links 135a–135c, respectively. Access network 130a, 130b, and 130c connect to service nodes $140_1$–$140_N$, $145_1$–$145_N$, and $150_1$–$150_N$, respectively. Each of service nodes $140_1$–$140_N$, $145_1$–$145_N$, and $150_1$–$150_N$ may include equipment, which generate traffic in form of, for example, voice, data, and/or video.

Figure 2:
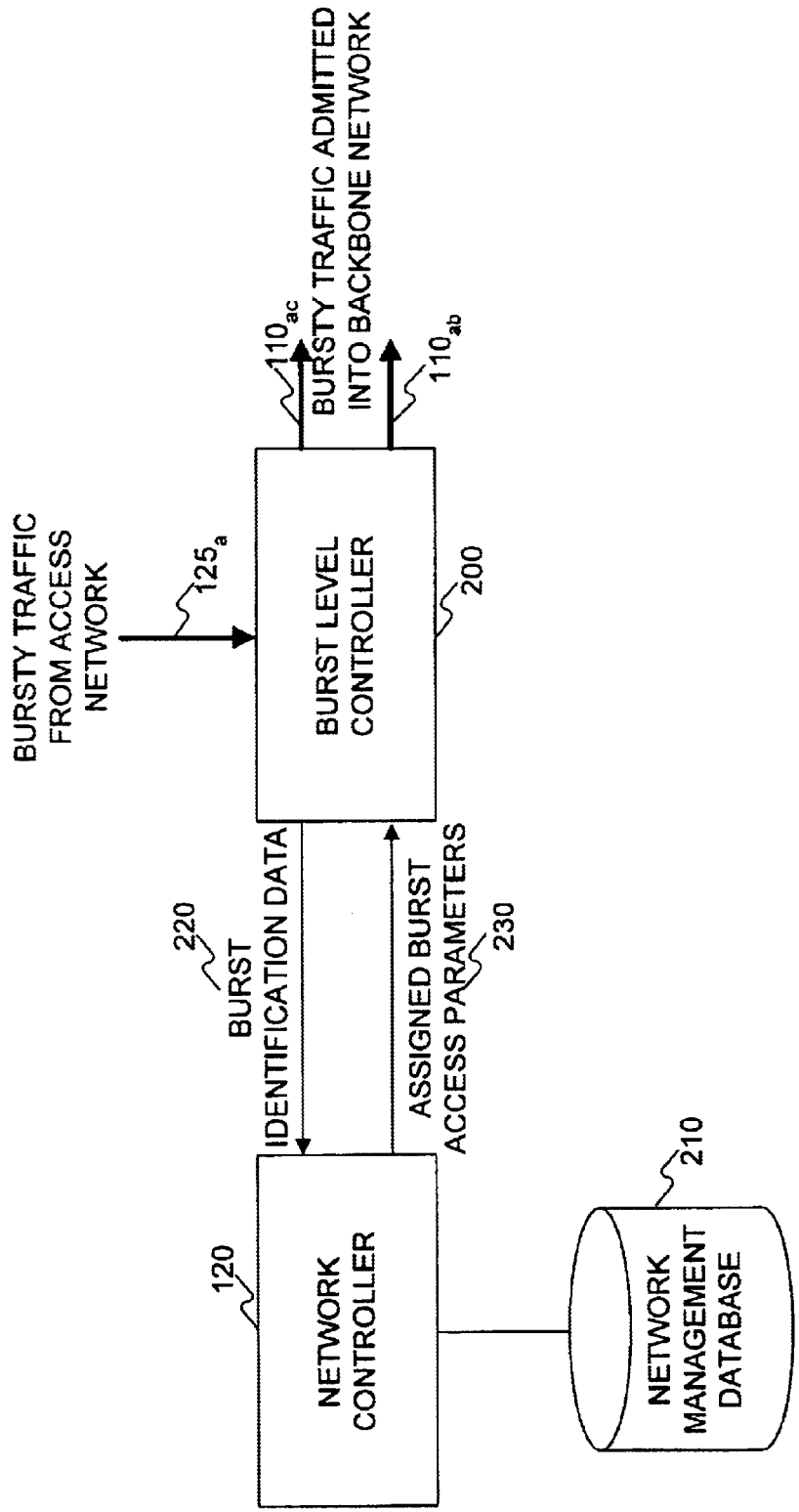
FIG. 2 is a block diagram of a network controller and a burst level controller in an ATM backbone network in accordance with an embodiment of the invention.

FIG. 2 is a block diagram of network controller 120 and a burst level controller 200 in node 100a in accordance with an embodiment of the invention. Burst level controller 200 communicates with network controller 120 via link 125a. Similarly, nodes 100b and 100c may also include burst level controllers, which communicate with network controller 120 via links 125b and 125c, respectively.

As shown in FIG. 2, burst level controller 200 receives traffic from access network 130a via link 135a. Burst level controller 200 then sends via link 125a (shown in FIG. 1) burst identification data 220 to network controller 120, and receives via link 125a burst access parameters 230 from network controller 120. Burst identification data 220 may include, for example, the time when a burst begins, the time when the burst ends, the peak cell rate, service class, and the virtual path associated with the burst.

Figure 3:
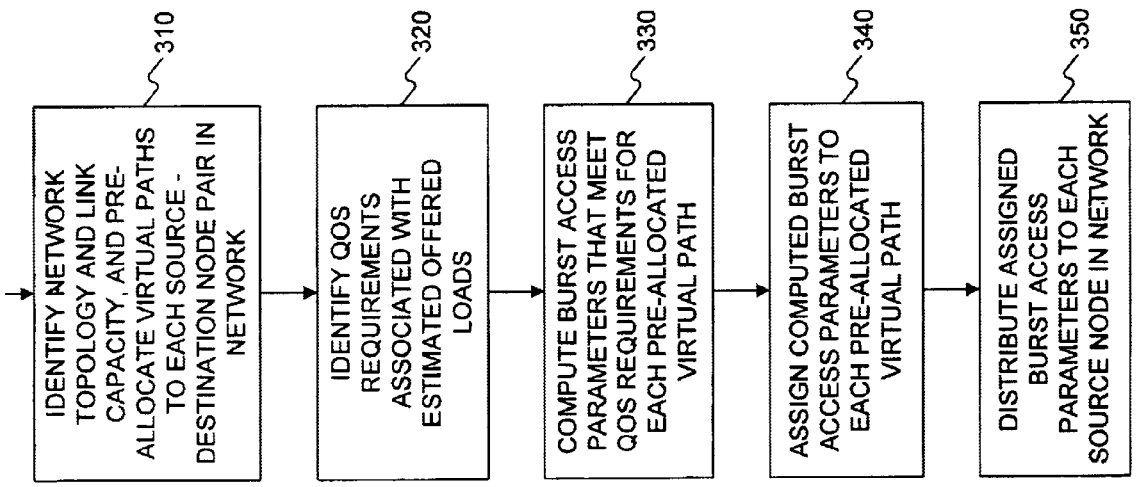
FIG. 3 is a flow chart of the steps that a network controller performs in accordance with an embodiment of the invention.

FIG. 3 is a flow chart of the steps that network controller 120 performs in accordance with an embodiment of the invention. Network controller 120 estimates the offered load and the burst parameters associated with each service class for each source-destination node pair in network 160 (step 300). The estimated offered load may include, for example, the average number of cells that are directed to network 160 from access networks 130a through 130c. For each service class, the estimated burst parameters may include the mean duration of bursts and the peak cell rate of the bursts corresponding to the estimated offered load.

Network controller 120 also identifies the topology of network 160 and capacity (or bandwidth) of links 110ab, 110ac, and 110bc, and pre-allocates a set of virtual paths for each source-destination node pair in network 160 (step 310). Each pre-allocated virtual path may span one or more links. For example, network 160 may establish between source node 100a and destination node 100c a virtual path consisting of links 110ab and 110bs. Similarly, network 160 may establish between source node 100a and destination node 100c another virtual path consisting of link 110ac.

Network controller 120 identifies the QoS requirements associated with the estimated offered loads for each source-destination node pair (step 320). Network controller 120 computes a set of burst access parameters that meet the identified QoS requirements for each pre-allocated virtual path between the source-destination node pairs (step 330). Network controller 120 assigns the computed burst access parameters to each pre-allocated virtual path between the source-destination node pairs (step 340). Network controller 120 then distributes the assigned burst access parameters to each source node in network 160 (step 350).

Figure 4:
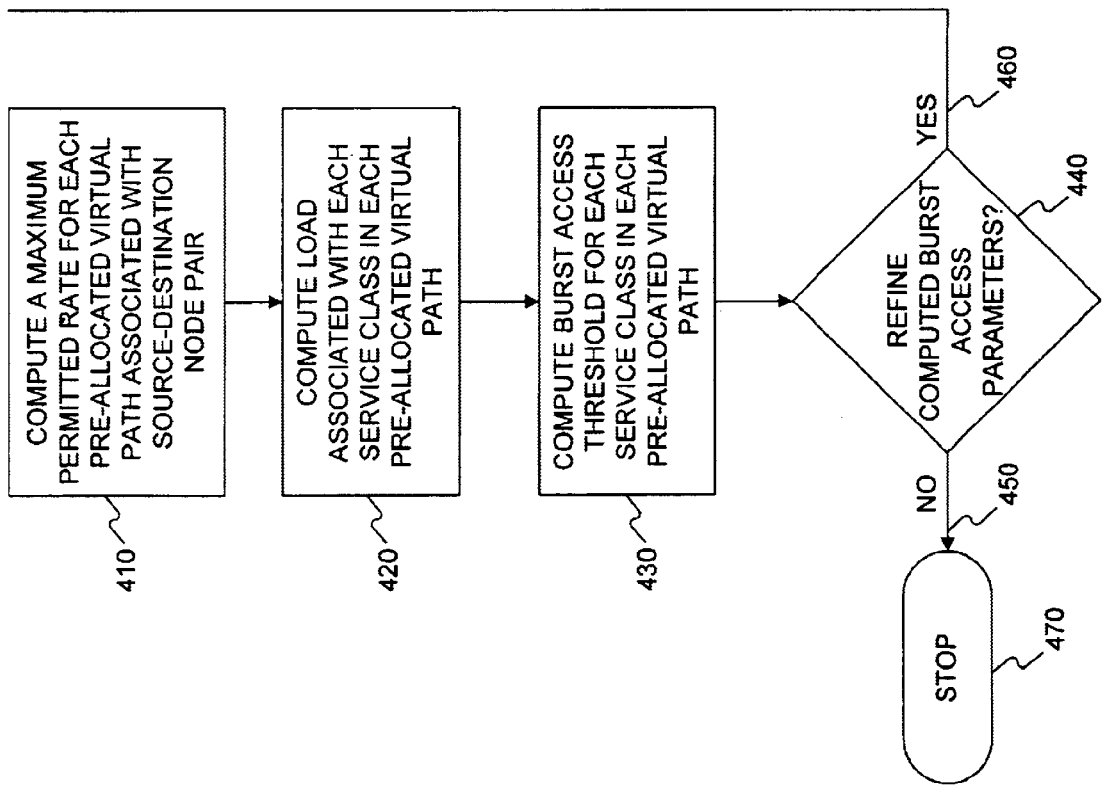
FIG. 4 is a flow chart of the steps that a network controller performs to compute burst access parameters in accordance with an embodiment of the invention.

FIG. 4 is a flow chart of the steps that network controller performs 120 to compute a set of burst access parameters, subject to network capacity, quality of service burst rejection requirements, and conservation flow constraints, such that a total weighted rate of burst rejections in network 160 is minimized in accordance with an embodiment of the invention. Network controller 120 computes a total maximum permitted rate (MPR) for each source-destination node pair (step 400). Network controller 120 then computes a maximum permitted rate, for example in units of cells per second, for each pre-allocated virtual path between each source-destination node pair (step 410). Based on the computed maximum permitted rates in step 410, network controller 120 then computes an estimated offered load associated with each service class in each pre-allocated virtual path (step 420). Based on the maximum permitted rates computed in step 410 and the estimated traffic loads computed in step 420, network controller 120 then computes a burst access threshold, for example in unit of cells per second, for each service class in each pre-allocated virtual path (step 430).

Network controller 120 also determines whether the burst access parameters computed in steps 400–430 need further refinement (step 440). If the computed burst access parameters require further refinement (step 460), then network controller 120 computes a new set of burst access parameters by repeating steps 400–430. If the computed burst access parameters do not require further refinement (step 450), then network controller 120 does not compute a new set of burst access parameters (step 470).

Figure 5:
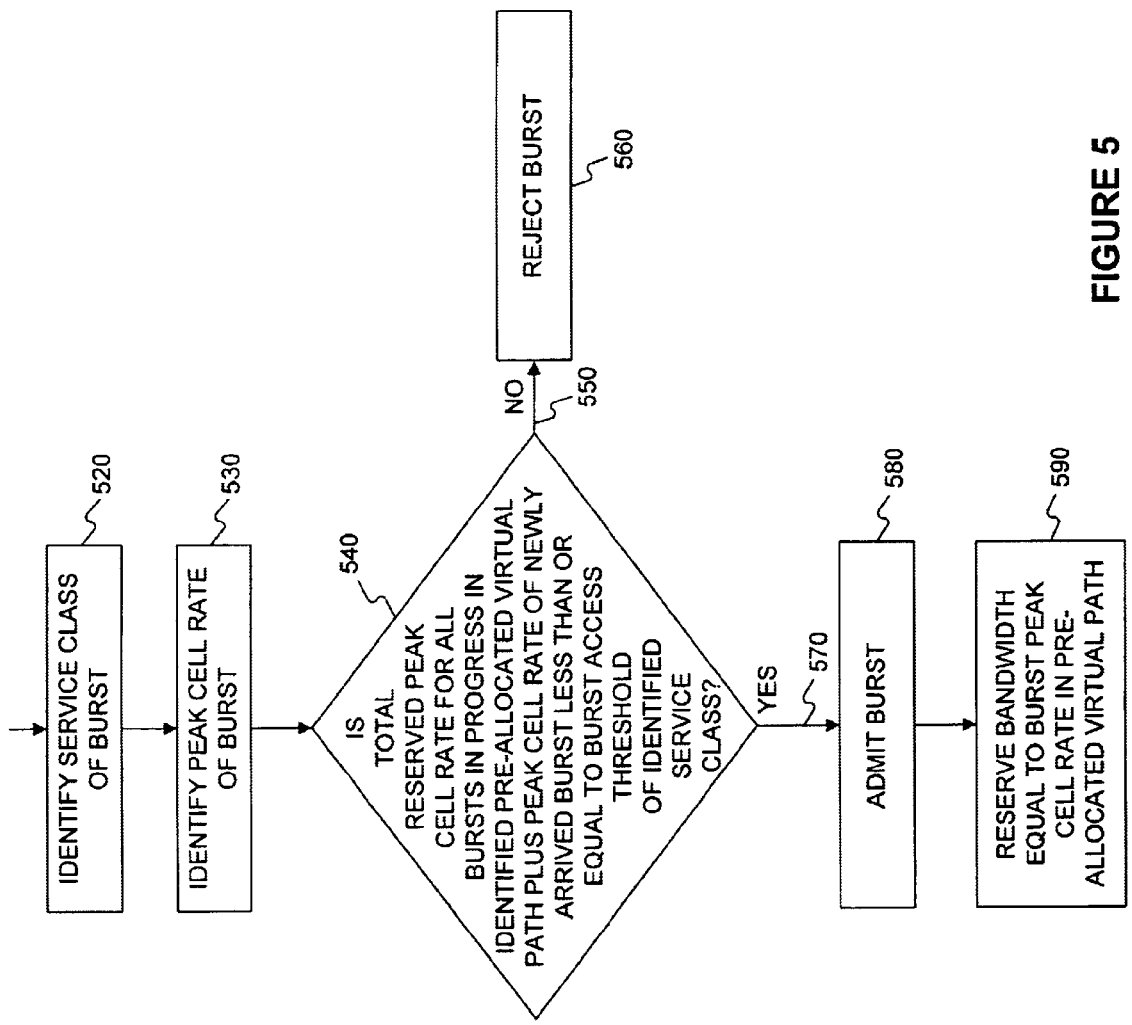
FIG. 5 is a flow chart of the steps that a burst level controller performs to control bursty traffic in accordance with an embodiment of the invention.

FIG. 5 is a flow chart of the steps that burst level controller 200 performs to control traffic at source node 100a in accordance with an embodiment of the invention. Burst level controller 200 detects the beginning of a newly arrived burst (step 500). For example, for connectionless traffic, burst controller 200 may detect the beginning of the burst from the existence of a token in the traffic stream. The service node that generates the traffic, for example a customer premise equipment (CPE), or the ATM Adaptation Layer (AAL) inserts the token in the bursty traffic. In the embodiment of FIG. 1, service nodes $140_1$ through $140_N$ may insert the tokens in the traffic generated by each service node. Alternatively, the ATM Adaptation Layer in access network 130a may insert the tokens. The token must include the destination of the burst, peak cell rate of the burst, and the QoS parameters of the burst.

For connection-oriented traffic, burst level controller 200 may detect the beginning of the burst from the arrival of a new cell on a virtual circuit. Alternatively, burst level controller 200 may detect the beginning of a cell from the existence of a token. However, for the connection-oriented traffic, the token does not need to include the destination of the burst, peak cell rate of the burst, and the QoS parameters of the burst.

Burst level controller 200 identifies the pre-allocated virtual path (step 510), service class (step 520) and the peak cell rate (step 530) associated with the detected burst. Burst level controller 200 then determines whether the total reserved peak cell rate for all bursts in progress in the identified pre-allocated virtual path plus the peak cell rate of the detected burst is less than or equal to the burst access threshold of the identified service class (step 540). If burst level controller 200 determines that the total reserved peak cell rate for all bursts in progress in the identified pre-allocated virtual path plus the peak cell rate of the detected burst is not less than or equal to the burst access threshold of the identified service class (step 550), then burst level controller 200 rejects the burst from network 160 (step 560).

If burst level controller 200 determines that the total reserved peak cell rate for all bursts in progress in the identified pre-allocated virtual path plus the peak cell rate of the detected burst is less than or equal to the burst access threshold of the identified service class (step 570), then burst level controller 200 admits the detected burst onto the identified pre-allocated virtual path (step 580). Burst level controller 200 then reserves in the identified pre-allocated virtual path a bandwidth equal to the peak cell rate of the detected burst (step 590).

When burst level controller 200 detects the end of the detected burst, burst level controller 200 subtracts the peak cell rate of the detected burst from the total reserved peak cell rate for all bursts in progress in the identified pre-allocated virtual path. For connection-oriented traffic and connectionless traffic, burst controller 200 may detect the end of the burst from the existence of a token in the traffic stream. Alternatively, for connection-oriented traffic, burst controller 200 may detect the end of the burst when the silent period in the traffic stream exceeds a pre-determined threshold. A network operator may set this threshold in burst level controller 200 to be greater than or equal to the reverse of the burst peak cell rate.

Traffic Model

In accordance with an embodiment of the present invention, a traffic directed to network 160 may include bursts that are separated by silent time intervals, which are modeled in network controller 120 by a Poisson distribution. Specifically, the cells in each burst may be separated by time intervals that are statistically much shorter than the silent time intervals. Accordingly, the cell inter-arrival rate may be much smaller than the burst inter-arrival rate, and the probability that the cell inter-arrival time exceeds the average burst inter-arrival time may be small. Thus, the minimum cell inter-arrival time is limited by the reverse of the burst peak cell rate.

The number of cells in a burst (or the burst length) may be represented as a random variable L, which may have an infinite variance (i.e., heavy-tail property). A Poreto distribution is one example of a probability distribution with an infinite variance, which may be represented as follows:

$$P(L=n) = \frac{b}{n^{(2+a)}},$$

where 1>a>0, and b is a normalized constant, such that $$\sum_{n=1}^{\infty} \frac{b}{n^{(2+a)}}.$$

Parameter a may be represented as a monotonically decreasing function of the average burst length, which may be represented as follows:

$$\bar{L} = \sum_{(n=1n)}^{\infty} \frac{b}{(1+a)}.$$

Furthermore, in the case of traffic that includes multiple classes of service, parameter a, b, and $\bar{L}$ may be expressed as a function of service class k as follows:

$$a=a(k), b=b(k) \text{ and } \bar{L}=\bar{L}(k), \text{ where } k=1,2,\ldots,K.$$

Burst Rejection Probabilities

Network controller 120 computes the burst rejection probabilities in network 160 based on the following parameters:

A(v, k)—estimated burst arrival rate of service class k at the source node of a source-destination node pair v, for example, source node 100a and destination node 100c;

u(v)—estimated total load on the burst level offered to a source-destination node pair v;

u(v, k)—service class k estimated load offered on the burst level to source-destination node pair v;

u(v, k, s)—service class k estimated load on the burst level offered to a pre-allocated virtual path s between a source-destination node pair v;

(v, k, s)—fraction of class k bursts that arrive at the source node of a source-destination node pair v and are routed on a pre-allocated virtual path s between the source-destination node pair v, where Σp(v, k, s)=1 for p(v, k, s)≧0;

B(v, k, s)—probability of rejection of a service class k burst from a pre-allocated virtual path s between source-destination node pair v;

d(k)—QoS requirement limiting the rejection rate of a service class k burst from a pre-allocated virtual path s between a source-destination node pair v;

M(v, s)—maximum permitted rate for a pre-allocated virtual path s between a source-destination node pair v;

q(v, k, s)—burst access threshold associated with service class k, where 0≦q(v, k, s)≦M(v, s);

R(v, s)—total reserved peak cell rate for all bursts in progress in a pre-allocated virtual path s between a source-destination node pair v;

R(v, k, s)—service class k estimated load on the cell level offered on a pre-allocated virtual path s between source-destination node pair v;

F(R, v, s)—probability that R(v, s) equals R, where 0≦R≦M(v, s);

T(k)—estimated mean burst duration;

r(k)—peak cell rate of burst associated with service class k.

Network controller 120 estimates load u(v, k) offered to source-destination node pair v in terms of the burst arrival rate (A(v, k)) of service class k at the source node of a source-destination node pair v and mean burst duration (T(k)) as follows:

$$u(v, k)=A(v, k)T(k)$$

Similarly, network controller 120 estimates load u(v, k, s) offered on a pre-allocated virtual path s between a source-destination node pair v in terms of the burst arrival rate (A(v, k)) of service class k at the source node of a source-destination node pair v, mean burst duration (T(k)) and the fraction of class k bursts (p(v, k, s)) that arrive at the source node of the source-destination node pair v and are routed on the pre-allocated virtual path s between the source-destination node pair v as follows:

$$u(v, k, s) = A(v, k)p(v, k, s)T(k)$$

$$\bar{R}(v, k, s) = u(v, k, s)r(k). \quad (1)$$

Network controller 120 computes the probability distribution of the total reserved peak cell rate for all bursts in progress in a pre-allocated virtual path s between a source-destination node pair v. In an embodiment where each q(v, k, s) is preset to M(v, s), network controller 120 computes F(R, v, s)) and B(v, k, s) using the following equations:

$$RF(R, v, s) = \Sigma u(v, k, s)r(k)F(R-r(k), v, s), \text{ where the sum is taken over all service classes } k=1, \ldots, K;$$

$$F(x, v, s) = 0, \text{ if } x < 0; \quad (2)$$

$$\Sigma F(R, v, s) = 1, \text{ where the sum is taken from } R=0 \text{ to } M(v, s); \text{ and } (3)$$

$$B(v, k, s) = \Sigma F(R, v, s), \text{ where the sum is taken from } R \text{ greater than } M(v, s)-r(k) \text{ to } M(v, s). \quad (4)$$

Network controller 120 then recursively solves equations (2) and (3) to determine based on equation (4) the probability of rejection (B(v, k, s)) of a service class k burst from a pre-allocated virtual path s between a source-destination node pair v.

In an embodiment where each q(v, k, s) is not preset to M(v, s), network controller 120 computes F(R, v, s) and B(v, k, s) using, for example, the method disclosed in A. Gersht, K. J. Lee, "Virtual-Circuit Load Control In Fast Packet-Switch Broadband Networks," Proceedings of GLOBE-COM '88, December 1988, which is incorporated herein by reference.

Burst Access Parameter Engineering

In accordance with an embodiment of the present invention, network controller 120 computes the burst access parameters described in FIG. 4 (steps 400–470) as follows: Network controller 120 computes the burst access parameters so that they satisfy the QoS burst rejection requirement (d(k)) of each service class k in each pre-allocated virtual path s between each source-destination node pair v in network 160, such that a total weighted rate of burst rejections in network 160 is minimized for a particular set of link capacities (or bandwidth) and QoS burst rejection requirements.

Network controller 120 computes the burst access parameters based on the following parameters:

$M_l$—total maximum permitted rate assigned by network controller 120 to link l, for example link 110ab, where $M_l = \Sigma M(v, s)$ with the sum taken over all pre-allocated virtual paths s on link l.

$C_l$—total capacity (or bandwidth) of link l;

w(k)—weight assigned to service class k based on, for example, priority of service class k;

Q(v, s)—weighted rate of burst rejection on a pre-allocated virtual path s between a source-destination node pair v; and Q—total weighted rate of burst rejections in network 160, where Q=ΣQ(v, s) with the sum taken over all pre-allocated virtual paths s between all source-destination node pairs v in network 160.

To compute burst access parameters, network controller 120 uses the weighted rate of burst rejection Q(v, s) on a pre-allocated virtual path s between a source-destination node pair v. The weighted rate of burst rejections Q(v, s) is defined as follows:

$$Q(v, s) = \sum_{k=1}^{K} A(v, k)p(v, k, s)B(v, k, s)w(k) \quad (5)$$

Network controller 120 then minimizes the total weighted rate of burst rejections Q over the parameters M(v, s), p(v, k, s), and q(v, k, s). Specifically, for a particular A(v, k), T(k), w(k), network topology, link capacities, and a set of pre-allocated virtual paths, network controller 120 minimizes Q over M(v, s), p(v, k, s), and q(v, k, s), subject to the following constraints:

QoS burst rejection constraint: B(v, k, s)≦d(k);

link capacity constraint: $M_l \leq C_l$;

conservation flow constraint: Σp(v, k, s)=1, p(v, k, s)≧0; and burst access thresholds constraint: 0≦q(v, k, s)≦M(v, s).

Relaxation of QoS Burst Rejection Constraint

Network controller 120 uses a penalty function method to relax the QoS burst rejection constraint. Specifically, network controller 120 uses the penalty function G(v, k, s) for non-compliance with the QoS burst rejection constraint for service class k in a pre-allocated virtual path s between a source-destination node pair v as follows:

$$G(v, k, s) = g\left(\frac{B(v, k, s)}{d(k)} - 1\right)^2 \text{ if } B(v, k, s) \geq d(k), \quad (6)$$

$$\text{and } G(v, k, s) = 0, \text{ otherwise,}$$

where g is a positive multiplier that determines the strength of penalty for violating the QoS burst rejection constraint, B(v, k, s)≦d(k). Similarly, network controller 120 uses the penalty function G(v, s) for non-compliance with the QoS burst rejection constraint for all service classes in a pre-allocated virtual path s between a source-destination node pair v as follows:

G(v, s) = ΣG(v, k, s), where the sum is taken from k=1 to k=K.

Network controller 120 then represents a total weighted rate of burst rejections in a pre-allocated virtual path s between a source-destination node pair v as follows:

$$Q^*(v, s) = Q(v, s) + G(v, s); \quad (7)$$

G=ΣG(v, s), where the sum is taken over all pre-allocated virtual paths s between all source-destination node pairs v in network 160;

Q* = Q + G.

Then, network controller 120 minimizes Q* subject to the following constraints:

link capacity constraint: $M_l \leq C_l$;

conservation flow constraint: Σp(v, k, s)=1, p(v, k, s)≧0; and burst access thresholds constraint: 0≦q(v, k, s)≦M(v, s).

In addition, network controller 120 decomposes the task of minimizing the total weighted rate of burst rejections Q* into three related sub-tasks, which are as follows:

sub-task (1): compute, M(v, s), the maximum permitted rates for each pre-allocated virtual path s between each source-destination pair v;

sub-task (2): compute, p(v, k, s), the fraction of class k bursts that arrive at the source node of a source-destination node pair v and are routed on a pre-allocated virtual path s between the source-destination node pair v; and sub-task (3): compute, q(v, k, s), the burst access thresholds for each service class k in a pre-allocated virtual path s between a source-destination node pair v.

Network controller 120 performs sub-tasks (1) through (3) in a sequential fashion. For each sub-task, network controller 120 optimizes an objective function (as defined below) over each set of variables $M^t(v, s)$, $p^t(v, k, s)$, and $q^t(v, k, s)$, respectively, while keeping the other two sets of variables fixed, where t represents a particular iteration. For example, after completing an iteration t of sub-task (1), network controller 120 uses the computed $M^t(v, s)$ to compute $p^t(v, k, s)$. Similarly, after completing an iteration t of sub-task (2), network controller 120 uses the computed $M^t(v, s)$ and $p^t(v, k, s)$ to compute $q^t(v, k, s)$. Network controller may, if needed, repeat sub-tasks (1) through (3) in order to refine each computed $M^t(v, s)$, $p^t(v, k, s)$, and $q^t(v, k, s)$.

Sub-Task(1): Computation of Maximum Permitted Rates

Network controller 120 computes an estimate of $M^t(v)$, the total maximum permitted rate for all pre-allocated virtual paths s between each source-destination node pair v in network 160, and assigns a maximum permitted rate, $M^t(v, s)$, to each pre-allocated virtual path s between each source-destination node pair v such that the QoS burst rejection constraint, $B^t(v, k, s) \leq d(k)$, and the link capacity constraint, $M_l^t \leq C_l$, are satisfied. Specifically, network controller 120 uses an iterative procedure to compute an estimate of $M^t(v)$ and assign each $M^t(v, s)$ to each pre-allocated virtual path s. At each iteration t, based on $p^{t-1}(v, k, s)$, and $q^{t-1}(v, k, s)$, which network controller 120 computes at iteration t−1, network controller 120 computes an estimated $M^t(v)$ for each source-destination node pair v, and assigns $M^t(v, s)$ to each pre-allocated virtual path s in network 160.

Network controller 120 uses as initial estimate of $M^t(v)$ the following lower bound for $M^t(v)$:

$$M(v) \geq \sum_{s,k} \overline{R}(v, k, s)(1 - d(k)).$$

At an initial iteration t=0, network controller 120 initializes M(v) as follows:

$M^0(v) = \Sigma \overline{R}(v, k, s)(1-d(k))$, where the sum is taken over all service classes k=1 ..., K, and over all pre-allocated virtual paths s between source-destination node pair v; and $M^0(v) = \Sigma A(v, k)T(k)r(k)(1-d(k))$, where the sum is taken over all service classes k=1, ..., K.

Network controller 120 then computes an $M^t(v, s)$ for each pre-allocated virtual path between each source-destination node pair v as follows: Network controller 120 computes a $M^t(v, s)$ for each pre-allocated virtual path such that the maximal link virtual residual capacity, $(C_1 - M_1)$, is minimized subject to $\Sigma M^t(v, s) = M^t(v)$, where the sum is taken over all pre-allocated virtual paths s in network 160 and $0 \leq M^t(v, s)$. Network controller 120 computes each $M^t(v, s)$ by using a flow deviation method, for example, the flow deviation method disclosed in A. Gersht, A. Shulman, "Optimal Routing In Circuit-Switched Communication Networks," IEEE Transactions On Communications, Volume 37, No. 11, November 1989.

After the initial iteration at each iteration t, network controller 120 refines $M^t(v)$ based on $M^{t-1}(v)$, which network controller 120 computed at iteration t−1, as follows:

$$M^t(v) = M^{t-1}(v) + b^{t-1}(v),$$

where $b^t(v)$ is the step size by which network controller 120 increments $M^t(v)$, and $b^0(v)$ equals 0. For $t \geq 1$, network controller 120 selects $b^t(v)$ to be proportional to the maximum of $(B(v, k, s)/d(k))-1$, which is computed at iteration t−1, and where the maximum is taken over all service classes k=1, ..., K and over all pre-allocated virtual paths s between source-destination node pair v. These iterations continue until the QoS burst rejection constraint is satisfied for all classes in each pre-allocated virtual path s between each source-destination node pair v. Network controller 120 then modifies $b^t(v)$ to decrease Q as long as the link capacity constraint, $M_l \leq C_l$, is satisfied.

Sub-Task(2): Computation of Load Assignments

Network controller 120 computes $p^t(v, k, s)$, the fraction of class k bursts that arrive at the source node of a source-destination node pair v and that are to be routed on a pre-allocated virtual path s between the source-destination node pair v, as follows: Based on the set of pre-allocated virtual paths, A(v, k), T(k), r(k), w(k), and $M^t(v, s)$ computed at iteration t and thresholds $q^{t-1}(v, k, s)$ computed at iteration t−1, network controller 120 computes each p(v, k, s) such that Q* is minimized, subject to $\Sigma p^t(v, k, s) = 1$, where $p^t(v, k, s) \geq 0$. At initial iteration t=0, network controller 120 computes the values of $p^t(v, k, s)$ that optimize Q* for a given set of $M^t(v, s)$ and $q^{t-1}(v, k, s)$ assuming that $q^0(v, k, s)$ equals $M^0(v, s)$.

Network controller 120 then computes, L(v, k, s), the length of a pre-allocated virtual path s between a source-destination node pair v for a service class k. Network controller 120 computes L(v, k, s) by taking a partial derivative of Q* with respect to p(v, k, s).

For any given M(v, s) and q(v, k, s) satisfying the burst access thresholds constraint, $0 \leq q(v, k, s) \leq M(v, s)$, network controller 120 computes a set of p(v k, s) for each source-destination node pair v independently. Each computed p(v, k, s) has a positive value only when the corresponding pre-allocated virtual paths s has a minimum L(v, k, s). From the computed p(v, k, s), network controller 120 uniquely determines Q*(v, s), and thus, Q*. If network controller 120 determines that G(v, s)=0, then the QoS burst rejection constraint is satisfied. In other words, Q*(v, s) equals Q(v, s), and network controller 120 has computed, for a given set of M(v, s) and q(v, k, s), the values of p(v, k, s) such that the total weighted rate of burst rejections Q is minimized subject to the QoS burst rejection constraint.

For each set of pre-allocated virtual paths s, network controller 120 computes the lengths, L(v, k, s), by taking partial derivatives of Q*(v, s) with respect to p(v, k, s). Network controller 120 uses an iterative flow deviation method, subject to the link capacity constraint, to shift the offered load to pre-allocated virtual paths s that have minimum lengths.

From equations (4), (5), (6), and (7), network controller 120 may compute the length of each pre-allocated virtual path s, L(v, k, s), as follows:

$$L(v, k, s) = \frac{\partial Q*(v, s)}{\partial p(v, k, s)} = A(v, k)B(v, k, s)w(k) + \qquad (8)$$

-continued $$\frac{\partial B(v, k, s)}{\partial p(v, k, s)} \left[ A(v, k) p(v, k, s) w(k) + \frac{2g}{d(k)} Y(v, k, s) \right],$$

where $Y(v, k, s) = \frac{B(v, k, s)}{d(k)} - 1$, if $\frac{B(v, k, s)}{d(k)} \geq 1$, and 0, otherwise;

and $\frac{\partial B(v, k, s)}{\partial p(v, k, s)} = \sum_{R > M(v,s) - r(k)}^{M(v,s)} \frac{\partial F(R, v, s)}{\partial p(v, k, s)}.$ In an embodiment where each q(v, k, s) is preset to M(v, s) for all service classes k and pre-allocated virtual paths s, network controller 120 computes the derivatives $$Z(R, v, k, s) = \frac{\partial F(R, v, s)}{\partial p(v, k, s)}$$

jointly with F(R, v, s) as follows: For R>0, network controller 120 computes Z(R, v, k, s) based on equations (2) and (3) by taking partial derivatives from both sides of equation (2) and using equation (1):

$$RZ(R, v, k, s) = \qquad (9)$$
$$A(v, k)T(k)r(k)F(R - r(k), v, s) + \sum_{l} u(v, l, s)r(l)Z(R - r(l), v, k, s)$$

Network controller 120 then takes the partial derivative of F(0, v, s) to compute Z(0, v, k, s) as follows:

$$Z(0, v, k, s) = -A(v, k)T(k)(1 - B(v, k, s))F(0, v, s) \qquad (10)$$

In an embodiment where each q(v, k, s) is not preset to M(v, s) for all service classes k and pre-allocated virtual paths s, network controller 120 computes F(R, v, s), and thus, Z(R, v, k, s) using, for example, the method disclosed in A. Gersht, K. J. Lee, "Virtual-Circuit Load Control In Fast Packet-Switch Broadband Networks," Proceedings of GLOBECOM '88, December 1988.

Network controller 120 recursively solves equations (9) and (10) jointly with equations (2) and (3) independently for each service class by performing the following steps: (Network controller 120 uses L(v, k, s, i) and p(v, k, s, i) to represent the values of L(v, k, s) and p(v, k, s) on the $i^{th}$ iteration, respectively.)

Step 0: Network controller 120 sets p(v, k, s, i) equal to (1/n(v)), where n(v) is the number of pre-allocated virtual paths s between a source-destination node pair v, and i=0.

Step 1: Network controller 120 computes L(v, k, s, i) from (8) through (10) using recursive equations (2) through (4) for p(v, k, s, i).

Step 2: Network controller 120 computes L(v, k, s, i) using the equation p(v, k, s, i+1)=(1-γ(i))p(v, k, s, i)+γ(i)δ(v, k, s, i), where γ(i) represents the step size, and δ(v, k, s, i) equals 1, if L(v, k, s, i) equals the minimum value of L(v, k, m, i), where m is an index representing a pre-allocated virtual path s and the minimum is taken over all pre-allocated virtual paths m, and δ(v, k, s, i) equals 0, otherwise.

Step 3: Network controller 120 repeats Steps 1 and 2 until the difference between the maximum length pre-allocated virtual path and the minimum length pre-allocated virtual path is less than ε, where ε is a predetermined parameter.

Sub-Task(3): Computation of Burst Access Thresholds

For a given set of M'(v, s), p'(v, k, s), and u'(v, k, s), network controller 120 computes a set of burst access thresholds, q'(v, k, s), such that the total weighted rate of burst rejections Q* is minimized over all q'(v, k, s) subject to the burst access threshold constraint, 0<q'(v, k, s)≦M'(v, s). At each iteration t, based on the computed values of M'(v, s) and p'(v, k, s), network controller 120 computes the values of q'(v, k, s) that minimize Q*(v, s) independently and, for example, in parallel for all pre-allocated virtual paths s.

Network controller uses an optimization method, for example the method disclosed in A. Gersht, K. J. Lee, "Virtual-Circuit Load Control In Fast Packet-Switch Broadband Networks," Proceedings of GLOBECOM '88, December 1988, to compute the values of q'(v, k, s).

While it has been illustrated and described what are at present considered to be preferred embodiments and methods of the present invention, it will be understood by those skilled in the art that various changes and modifications may be made, and equivalents may be substituted for elements thereof without departing from the true scope of the invention.

In addition, many modifications may be made to adapt a particular element, technique or implementation to the teachings of the present invention without departing from the central scope of the invention. Therefore, it is intended that this invention not be limited to the particular embodiments and methods disclosed herein, but that the invention include all embodiments falling within the scope of the appended claims.

What is claimed is:

1. A congestion control method for a network, said method comprising the steps of:

allocating, for a pre-determined interval of time, a set of virtual paths between a set of source node and destination node pairs in the network;

allocating, for the pre-determined interval of time, a set of maximum permitted rates to the allocated set of virtual paths, respectively;

assigning, for the pre-determined interval of time, a set of burst access thresholds to a set of service classes, respectively, wherein the assigned burst access thresholds are less than or equal to the corresponding allocated maximum permitted rates; and determining, at one of the source nodes in the network, whether to admit at burst level on one of the allocated set of virtual paths a burst in traffic using a reserved bandwidth equal to a peak cell rate of the burst based on the allocated set of maximum permitted rates and the assigned set of burst access thresholds; wherein determining further comprises:

detecting, at one of the source nodes, a beginning of the burst in the traffic;

identifying, from among the allocated set of virtual paths, the allocated virtual path corresponding to the detected burst;

identifying, from among the set of service classes, the service class corresponding to the detected burst;

identifying, from among the assigned set of burst access thresholds, the burst access threshold corresponding to the identified service class;

admitting the detected burst when the total reserved peak cell rate for all bursts that are in progress in the identified allocated virtual path plus the peak cell rate of the detected burst is less than or equal to the identified burst access threshold; and rejecting the detected burst when the total reserved peak cell rate for all bursts that are in progress in the identified allocated virtual path plus the peak cell rate of the detected burst is greater than the identified burst access threshold.

2. The method of claim 1 wherein said admitting step further comprises the step of:

reserving, in the identified allocated virtual path, the bandwidth equal to the peak cell rate of the detected burst.

3. The method of claim 1 further comprising the step of:

releasing, in the identified allocated virtual path, the reserved bandwidth when detecting an end of the detected burst.

4. A method for avoiding congestion in a network, said method comprising the steps of:

allocating, for a pre-determined interval of time, a set of virtual paths between a set of source node and destination node pairs in the network;

allocating, for the pre-determined interval of time, a set of maximum permitted rates to the allocated set of virtual paths, respectively; and determining, at one of the source nodes, whether to admit at burst level on one of the allocated set of virtual paths a burst in traffic using a reserved bandwidth equal to a peak cell rate of the burst based on the allocated set of maximum permitted rates;

wherein determining further comprises:

detecting, at one of the source nodes, a beginning of the burst in the traffic;

identifying, from among the allocated set of virtual paths, the allocated virtual path corresponding to the detected burst;

admitting the detected burst when the total reserved peak cell rate for all bursts that are in progress in the identified allocated virtual path plus the peak cell rate of the detected burst is less than or equal to the maximum permitted rate of the identified allocated virtual path; and rejecting the detected burst when the total reserved peak cell rate for all bursts that are in progress in the identified allocated virtual path plus the peak cell rate of the detected burst is greater than the maximum permitted rate of the identified allocated virtual path.

5. The method of claim 4, wherein said admitting step further comprises the step of:

reserving, in the identified allocated virtual path, the bandwidth equal to the peak cell rate of the detected burst.

6. The method of claim 4 further comprising the step of:

releasing, in the identified allocated virtual path, the reserved bandwidth when detecting an end of the detected burst.

* * * * *